(12) United States Patent
Seol

(10) Patent No.: US 7,437,745 B2
(45) Date of Patent: Oct. 14, 2008

(54) DISC ROLLER POSITION-CHANGING APPARATUS AND DISC PLAYER HAVING THE SAME

(75) Inventor: Young-yun Seol, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 431 days.

(21) Appl. No.: 11/176,399

(22) Filed: Jul. 8, 2005

(65) Prior Publication Data

US 2006/0031861 A1    Feb. 9, 2006

(30) Foreign Application Priority Data

Aug. 7, 2004    (KR) .................. 10-2004-0062229

(51) Int. Cl.
*G11B 17/04* (2006.01)

(52) U.S. Cl. ..................................... 720/624

(58) Field of Classification Search ............. 720/600, 720/617, 619–626, 636–639, 645
See application file for complete search history.

(56) References Cited

U.S. PATENT DOCUMENTS

| 6,978,467 B1* | 12/2005 | Fukushima et al. ......... 720/624 |
| 2003/0227856 A1* | 12/2003 | Kim et al. .................. 369/77.1 |
| 2003/0235131 A1* | 12/2003 | Kim et al. .................. 369/77.1 |
| 2003/0235132 A1* | 12/2003 | Lee et al. .................. 369/77.1 |

FOREIGN PATENT DOCUMENTS

| JP | 07-161107 | 6/1995 |
| JP | 08-007434 | 1/1996 |
| KR | 2001-0106253 | 11/2001 |
| KR | 2003-0077115 | 10/2003 |

* cited by examiner

*Primary Examiner*—Joseph Feild
*Assistant Examiner*—Nathan Danielsen
(74) *Attorney, Agent, or Firm*—Staas & Halsey LLP

(57) ABSTRACT

A disc roller position-changing apparatus and a disc player having the same are provided. The disc roller position-changing apparatus includes a movable hinge part for supporting the roller bracket on a main chassis such that the roller bracket is movable by a predetermined distance and pivotal, a protrusion part formed on the roller bracket, and a slider installed to be capable of reciprocating in a disc loading direction and selectively connected to a power transmission unit for transmitting power from a driving motor depending on its moving position, thereby being reciprocated. The slider has a guide slot part for receiving and guiding the protrusion part. Because the disc roller position-changing apparatus supports a disc roller such that the disc roller is movable by a predetermined distance when the disc roller is contacted with or separated from a disc, it is possible to reduce the operating space of the roller bracket and the height of a guide slot part, and as a result, it is possible to slim a resultant disc player having such a disc roller position-changing apparatus.

15 Claims, 15 Drawing Sheets

DISC ROLLER POSITION-CHANGING APPARATUS AND DISC PLAYER HAVING THE SAME

CROSS-REFERENCE TO RELATED APPLICATION

This application claims the benefit of Korean Patent Application No. 2004-62229 filed Aug. 7, 2004 in the Korean Intellectual Property Office, the disclosure of which is incorporated herein by reference.

BACKGROUND OF THE INVENTION

1. Field of the Invention

The present invention relates to a disc player for recording information into and/or reproducing recorded information from a disc such as a compact disc (CD), a CD-ROM, a digital video disc (DVD), and a DVD-ROM. More particularly, the present invention relates to a disc roller position-changing apparatus for bringing a disc roller for transferring a disc into contact with, or separating it from, a disc in a tray-less disc player such as a car disc player, and a disc player having such a disc roller position-changing apparatus.

2. Description of the Related Art

In general, a car disc player has a tray-less disc loading system loading a disc to a position for recording information into or reproducing information from a disc without a disc tray due to spatial restriction. When a disc is entered into the disc player from the front direction, a disc loading system loads the disc to a chucking position on a turntable using a disc roller and then seats the disc on the turntable to rotate thereon. The disc roller is lowered and separated from the disc by a disc roller position-changing apparatus so as not to interfere with the rotation of the disc. When the disc has been seated on the turntable, the disc player may record information into or reproduce recorded information from the disc as an optical pickup moves in the radial direction of the disc while the disc is rotating on the turntable.

FIGS. 1 to 3 show a conventional car disc player.

The disc player has a disc roller position-changing apparatus 12 for lifting or lowering a disc roller 11 to come in contact with, or separate from, a first disc 1 having a size of 120 mm or a second disc 2 having a size of 80 mm.

The disc roller position-changing apparatus 12 includes a roller bracket 13, a projection pin 15 and a guide slot 34.

Both front opposite ends of the roller bracket 13 are respectively formed with first and second hinge axles 18, 18' which are supported by first and second support brackets 19, 19' provided in the main chassis 10, and both rear opposite ends of the roller bracket 13 are respectively formed with first and second support bosses 21, 21' for supporting opposite ends of an axle 11a of the disc roller 11.

The front edge of the roller bracket 13 is formed with disc takeout prevention plates 17. The disc takeout prevention plates 17 block a disc transfer passage behind the first or second disc 1 or 2 after the first or second disc has been loaded, thereby preventing the disc from being forcibly taken out of the disc player.

The projection pin 15 is formed adjacent to the first support boss 21 of the roller bracket 13 to be projected toward a slider 30.

The guide slot 34 is formed in the slider 30 opposite to the projection pin 15 so that the guide slot 34 receives the projection pin 15, and the guide slot 34 guides the projection pin 15 to be lifted or lowered as the slider 30 moves.

Now, the disc loading operation of the disc player configured as described above is described.

As shown in FIG. 1, when a disc, e.g., a first disc 1 having a size of 120 mm is entered into a housing 50 in the loading direction, i.e., in the A1 direction, a controller (not shown) drives a driving motor 20 (see FIG. 3) on the basis of a signal from a disc detection sensor (not shown) for detecting the entry of the first disc 1. As a result, the first disc 1 is drawn into the housing 50 by the disc roller 11, wherein the disc roller 11 receives power from the driving motor 20 through a plurality of connection gears 22, 23, 24, 25, 26.

Thereafter, when the first disc 1 pushes first and second guide rollers 43, 44 of first and second pivot plates 41, 42, the first and second pivot plates 41, 42 pivot in the C and D directions, respectively. Consequently, a contact part 47 of the second pivot plate 42 pushes one end 49 of a first pushing lever 48. Then, while the first pushing lever 48 is rotating in the C direction, the other end 51 of the first pushing lever 48 pushes the slider 30 by a predetermined distance in the A2 direction.

A rack gear 31 is connected to a driving gear 32 which receives power of the of the driving motor 20 through the plurality of connection gears 22, 23, 36, 37 as shown in FIG. 3, with the result that the power of the driving gear 32 is transmitted to the rack gear 31 and thus the slider 30 is continuously moved in the A2 direction.

As the slider 30 moves, as shown in FIGS. 4 and 5, the cam slit 61 of the sub chassis 60 is guided by the movement of the cam lug 33 of the slider 30 and the sub chassis 60 is moved in the B1 direction from a position shown in FIGS. 1 and 2.

When the sub chassis 60 moves in the B1 direction as mentioned above, the guide slot 68 in the second vertical surface 67 of the sub chassis 60 also moves in the B1 direction. As a result, the projection pin 83 formed on the first vertical surface 82 of the chuck bracket 81 of the disc chucking apparatus 80 is guided and lowered by the guide slot 68, as shown in FIG. 5. As the projection pin 83 is lowered, the chuck bracket 81 pivots counterclockwise about the hinge axle 86 thereby being lowered, with the result that a clamper 90 installed at the front end of the chuck bracket 81 rotatably clamps the first disc 1 on the turntable 95.

In addition, as the slider 30 moves in the A2 direction, the projection pin 15 formed on the roller bracket 13 is guided and lowered by the guide slot 34 provided in the slider 30. As a result, the roller bracket 13 is rotated clockwise about the first and second hinge axles 18, 18', and the disc roller 11 supported by the roller bracket 13 is lowered and spaced from the first disc. At this time, the disc takeout prevention plates 17 formed at the front edge of the roller bracket 13 are vertically positioned to block the disc transferring passage behind the disc 1, so that the disc cannot be taken out from the disc player.

From this state, the first disc 1 is rotated on the turntable 95 and an optical pickup (not shown) records information into or reproduces recorded information from the first disc 1.

After information has been recorded or reproduced, the first disc 1 is unloaded as follows.

First, the driving motor 20 is reversely rotated to return the slider 30 in the A1 direction. Next, the sub chassis 60 is returned to its original position in the B2 direction (FIG. 1). As a result, the disc chucking apparatus 80 and the disc roller position-changing apparatus 12 are operated in the reversed sequence as to the first disc loading operation, and the first disc 1 is separated from the turntable 95 and at the same time comes into contact with the disc roller 11, whereby the first disc 1 is discharged out of the housing 50 by the disc roller 11.

However, the conventional car disc player configured as described above has a problem in that the roller bracket 13 should be rotated over a relatively large angle so as to bring the disc roller 11 into a contact with, or separate it from the first or second disc 1 or 2, and at the same time, to position the disc takeout prevention plate 17 at a vertical position blocking the disc transferring passage or at an open position opening the disc transferring passage, because the roller bracket 11 of the disc roller position-changing apparatus 12 has a construction fixedly supported by the first and second hinge axles 18, 18', whereby it is necessary to design the operating space required for rotating the roller bracket 13 and the height h of the guide slot 34 for rotating the roller bracket 13 over a predetermined range of arc to have large sizes, respectively.

If the operating space of the roller bracket 13 and the height of the guide slot 34 are designed to have large sizes, respectively, the entire thickness of a resultant disc player will increase and the graceful appearance of the disc player will be diminished.

SUMMARY OF THE INVENTION

Additional aspects and/or advantages of the invention will be set forth in part in the description which follows and, in part, will be apparent from the description, or may be learned by practice of the invention.

Accordingly, the present invention has been made to solve the above-mentioned problems, and an aspect of the present invention is to provide a disc roller position-changing apparatus which allows a disc player to be slim, where the disc roller position-changing apparatus causes a disc roller for transferring a disc to be in contact with, or separate from the disc, and a disc player having such a disc roller position-changing apparatus.

In order to achieve the above-mentioned aspect, there is provided a disc roller position-changing apparatus of a disc player including a disc roller for transferring a disc and a roller bracket for rotatably supporting the disc roller, where the apparatus further includes: a movable hinge part for supporting the roller bracket on a main chassis to be movable by a predetermined distance and pivotal; a protrusion part formed on the roller bracket; and a slider installed to be capable of reciprocating in a disc loading direction, wherein the slider includes a guide slot part for receiving and guiding the protrusion part.

The movable hinge part may includes at least one hinge axle formed at either the roller bracket or the main chassis, and at least one hinge hole formed elongately at the other of the roller bracket or the main chassis to receive and guide the hinge axle. The hinge hole may be inclined in a predetermined angle.

The protrusion part may include at least one projection pin, and the guide slot part may include at least one guide slot. The guide slot may include an ascent slot, a descent slot, and a slant slot interconnecting the ascent slot and descent slot.

According to another aspect of the present invention, there is provided a disc player for recording information into or reproducing recorded information from either a first disc of a first size or a second disc of a second size, where the disc player includes: a main chassis provided with a roller bracket for rotatably supporting a disc roller for transferring one of the first or second discs into the disc player; a slider mounted on a main chassis capable of reciprocating in a disc loading direction, and selectively connected to a power transmission unit for transmitting power from a driving motor depending on its moving position, thereby being reciprocated; and a disc roller position-changing apparatus for bringing the disc roller into contact with, or separating the disc roller from, the first or second disc in linkage with the slider, where the disc roller position-changing apparatus includes: a movable hinge part for supporting the roller bracket on a main chassis to be movable by a predetermined distance and pivotal; a protrusion part formed on the roller bracket; and a guide slot part formed in the slider to receive and guide the protrusion part so that the roller bracket is pivoted about the movable hinge part.

The movable hinge part may include at least one hinge axle formed at one of the roller bracket or the main chassis, and at least one hinge hole formed elongately at the other of the roller bracket or the main chassis to receive and guide the hinge axle. The hinge hole may be inclined in a predetermined angle.

The protrusion part may include at least one projection pin, and the guide slot part may include at least one guide slot. The guide slot preferably includes an ascent slot, a descent slot, and a slant slot interconnecting the ascent slot and descent slot.

BRIEF DESCRIPTION OF THE DRAWINGS

The above aspects and features of the present invention will be more apparent from the description for certain embodiments of the present invention taken with reference to the accompanying drawings, in which.

DETAILED DESCRIPTION OF THE PREFERRED EMBODIMENTS

Figure 1:
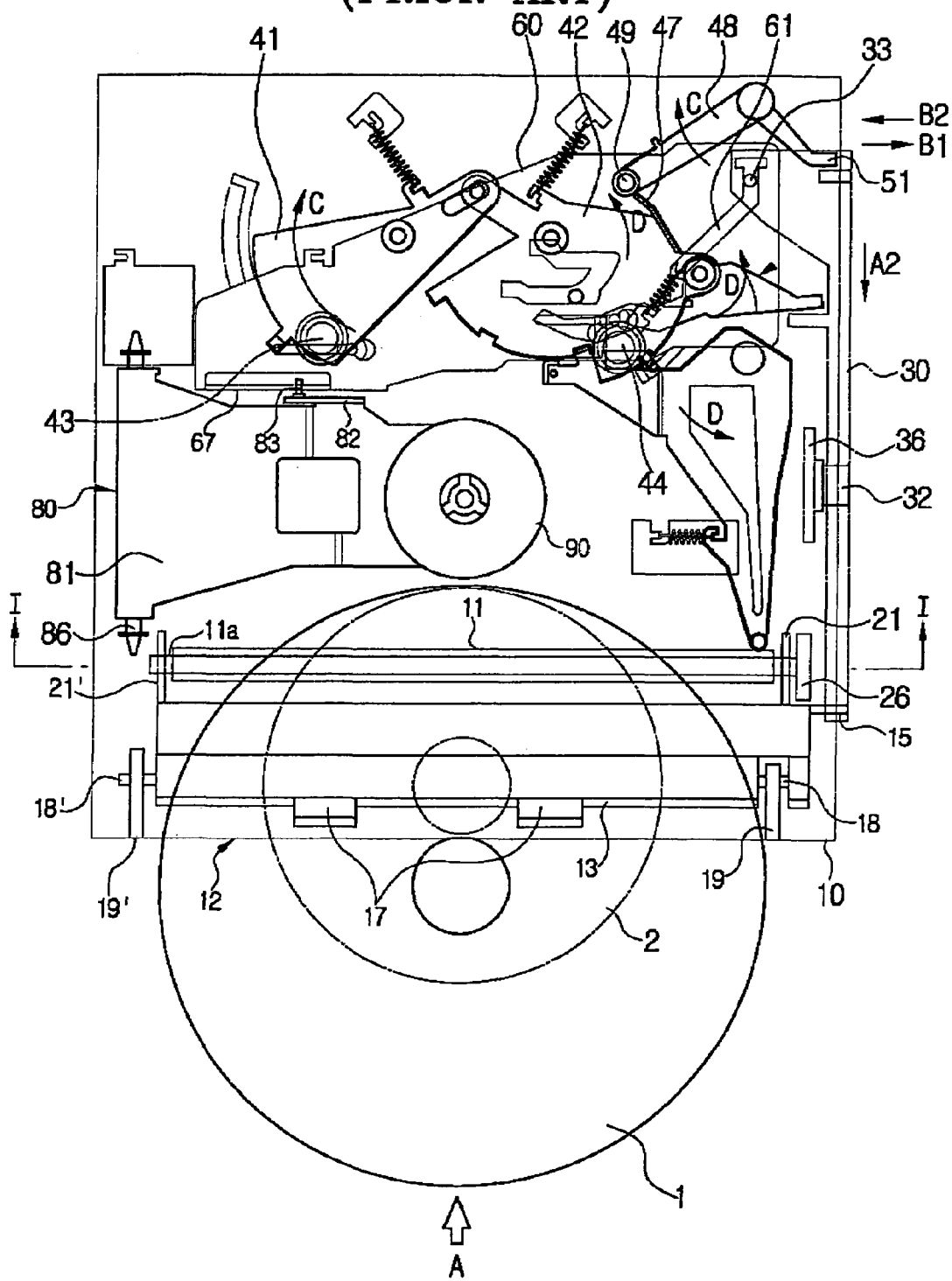
FIG. 1 is a schematic top plan view of a conventional disc player.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 7:
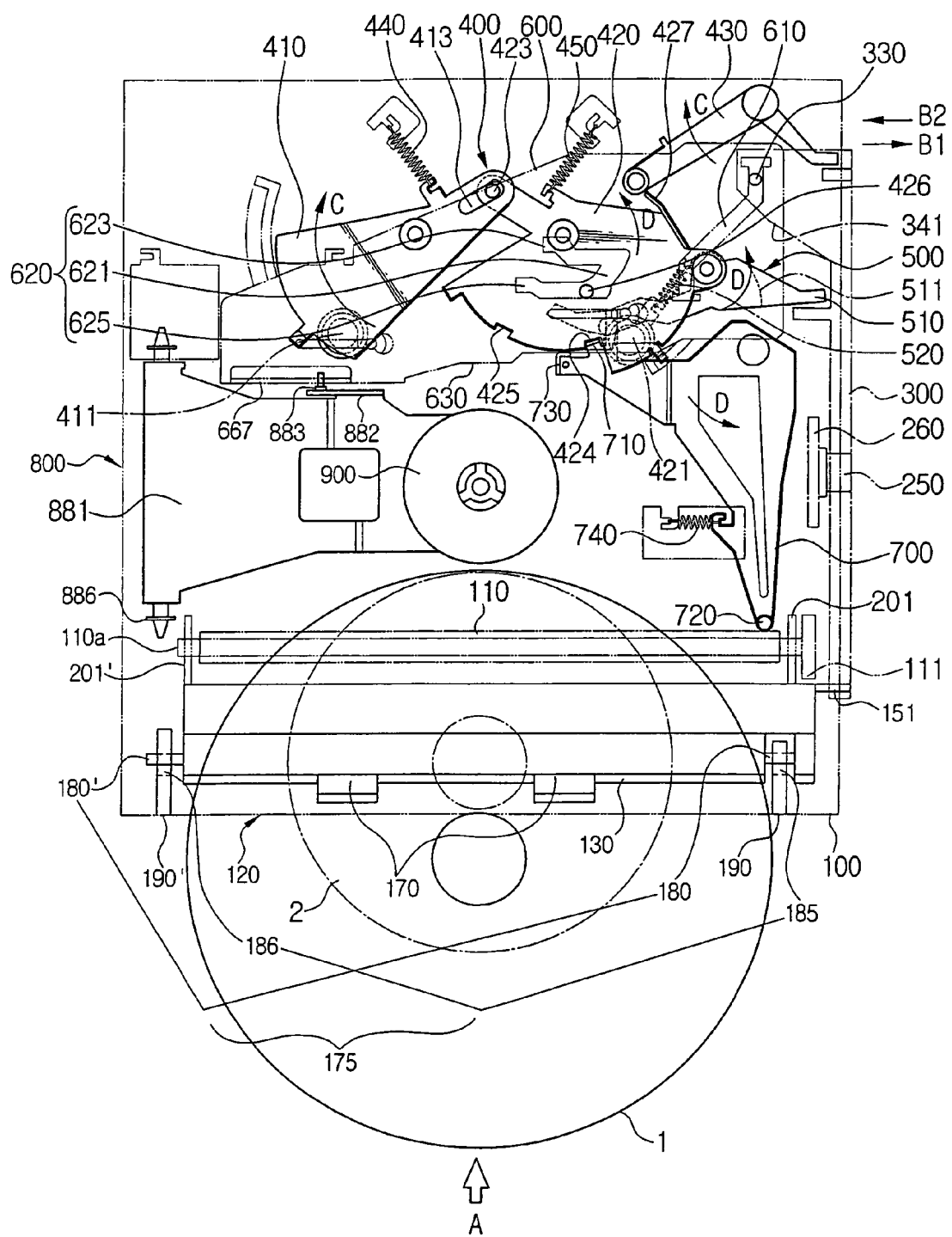
FIG. 7 is a schematic top plan view of a disc player having a disc roller position-changing apparatus according to a preferred embodiment of the present invention.
Figure 8:
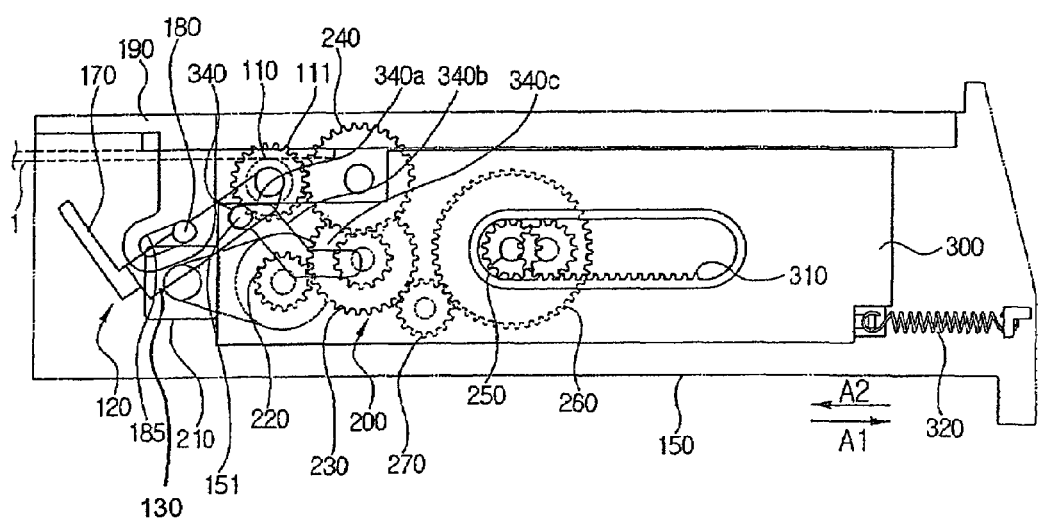
FIG. 8 is a side elevational view of the disc player shown in FIG. 7.

FIGS. 7 and 8 show a disc player having a disc roller position-changing apparatus according to the present invention.

The disc player includes a main chassis 100 with a disc roller 110 for transferring a first or second disc 1 or 2 rotatably mounted thereon, a power transmission unit 200 for transmitting power of a driving motor 210 to the disc roller 110, a slider 300 selectively connected to the power transmission unit 200 thereby being reciprocated, a first linkage mechanism 400 operated at the time of loading a first disc 1, a second linkage mechanism 500 operated at the time of loading a second disc 2, a sub chassis 600 reciprocating in linkage with the slider 300, a locking lever 700 for selectively locking or unlocking the first linkage mechanism 400, a disc chucking unit 800 for seating either a first or second disc 1 or 2 on a turntable (not shown) in linkage with the slider 300 in the rotatable state or removing the first or second disc from the turntable, and a disc roller position-changing apparatus 120 for bringing the disc roller 110 into contact with, or separating the disc roller 110 from the first or second disc 1 or 2 in linkage with the slider 300.

The first disc 1 is a conventional 120 mm size disc and the second disc 2 is a conventional 80 mm size disc. The disc player having the disc chucking apparatus according to the embodiment of the present invention is, for example, a car disc player, which can be compatibly loaded with discs of different sizes without employing a disc tray.

The disc roller 110 is rotated by the power received from the power transmission unit 200 to transfer a first or second disc 1 or 2 entered from the front edge of the main chassis 100, i.e., entered from the front side of the disc player to the interior of the disc player or discharging the first or second disc 1 or 2 loaded in the interior out of the disc player. The disc roller 110 and the axle 110a of the disc roller are rotatably supported by first and second support bosses 201, 201' at its opposite ends, where the first and second bosses are formed at opposite sides of the rear edge of roller bracket 130. The roller bracket 130 is pivotally mounted on first and second support brackets 190, 190'. When pivoted by the disc roller position-changing apparatus 120, which will be described in detail later, the roller bracket 130 comes into contact with or is spaced from the first or second disc 1 or 2.

The main chassis 100 is mounted on a housing 150 provided with an optical pickup (not shown).

The power transmission unit 200 includes a driving motor 210 installed in the housing 150, a plurality of connection gears 220, 230, 240 for transmitting the power of the driving motor 210 to a driven gear 111 connected to the disc roller 110, a driving gear 250 selectively meshed with a first rack gear 310 provided in the slider 300, and a main gear 260 coaxially connected to the driving gear 250. A simple connection gear 270 is interposed between the main gear 260 and the connection gear 230. As the driving motor 210 is bi-directionally rotatable, the driving motor 210 selectively rotates the disc roller 110 in either direction.

The slider 300 is connected to the main chassis 100 and capable of reciprocating in the disc loading direction of the first or second disc 1 or 2. The slider 300 has a rack gear 310 of a predetermined length. The rack gear 310 is arranged in such a way that it is spaced from the driving gear 250 at its original position, i.e., until the first or second disc 1 or 2 is loaded to the chucking position. In addition, the slider 300 is elastically biased in the A1 direction by a spring 320. When the first disc 1 is loaded, the slider 300 is pushed by the first linkage mechanism 400 and connected to the driving gear 250. When the second disc 2 is loaded, the slider 300 is pushed by the second linkage mechanism 500 and connected to the driving gear 250. In addition, the slider 300 has a cam lug 330 for moving the sub chassis 600 in the B1 and B2 directions transverse to the A1 and A2 directions when the slider 300 moves in the A1 and A2 directions.

The first linkage mechanism 400 is pushed by the first disc 1 when the first disc 1 is entered into the housing 150 and guides the first disc 1 to the chucking position. In addition, the first linkage mechanism 400 moves the slider 300 while guiding the first disc 1 to the chucking position, so that the first slider is connected with the power transmission unit 200. The first linkage unit 400 includes a first pivot plate 410 mounted on the main chassis 100 capable of rotating over a predetermined range of arc, a second pivot plate 420 mounted on the main chassis 100 to be linked with the first pivot plate 410 and to be capable of rotating over a predetermined range of arc, a first pushing lever 430 linked with the second pivot plate 420 to push the slider 300 for a predetermined distance in the A1 direction, and first and second springs 440, 450 for elastically biasing the first and second pivot plates 410, 420, respectively, to come into contact with the first disc 1 when entered.

The first pivot plate 410 has a first guide roller 411, which comes into contact with the first disc 1 as the first disc 1 is entered, thereby guiding the first disc 1 to the chucking position. In addition, the first disc 1 entered in the A1 direction pushes the first guide roller 411, whereby the first pivot plate 410 is pivoted in the C direction. An elongate hole 413 is formed at one end of the first pivot plate 410.

Figure 6:
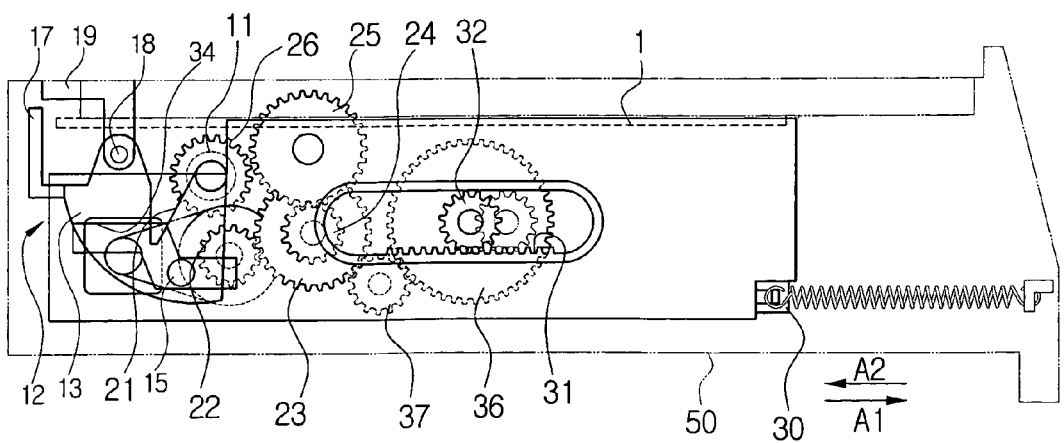
Figure 10:
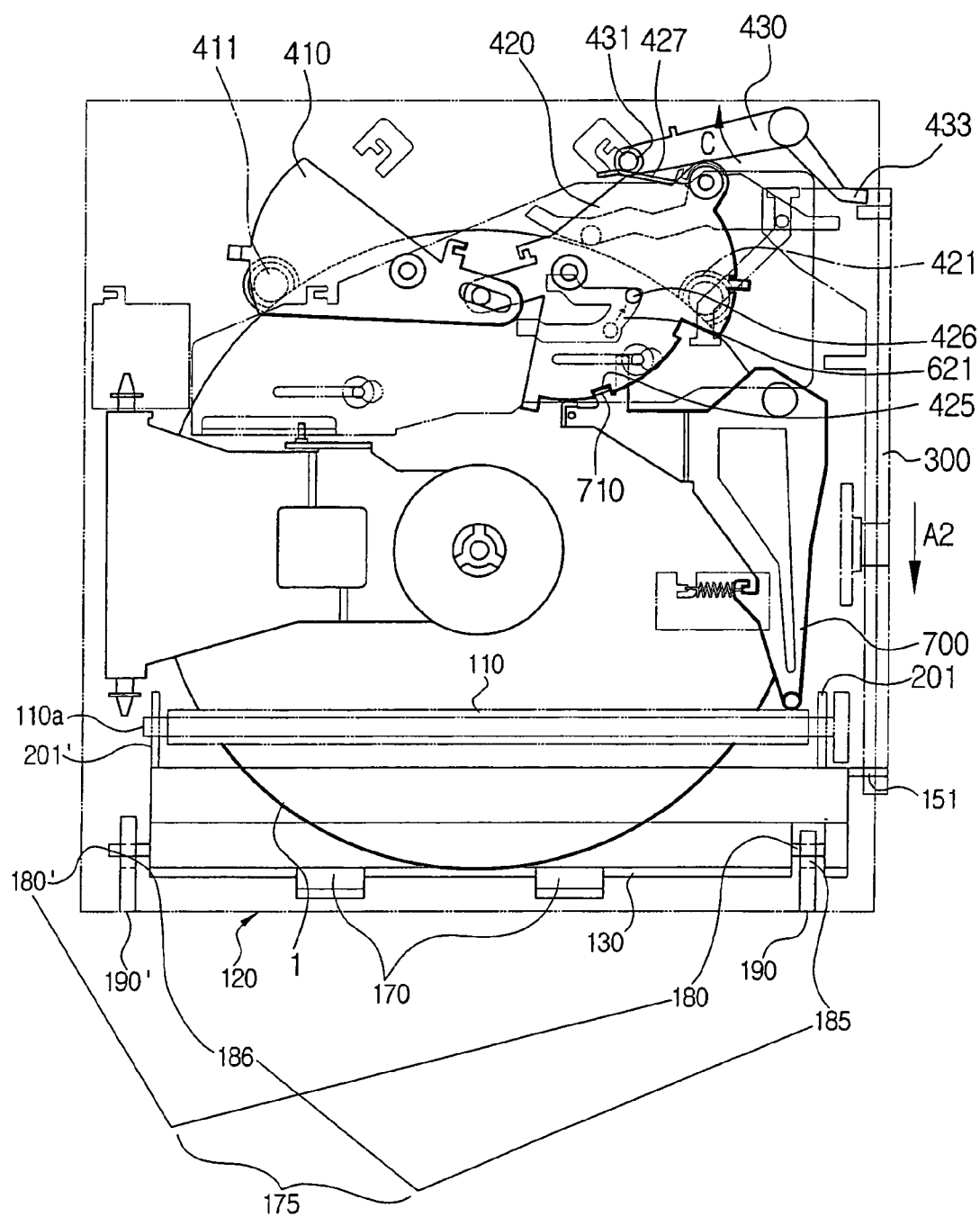

The second pivot plate 420 has a second guide roller 421 which also comes into contact with the first disc 1 as the first disc is being entered, thereby guiding the first disc 1 to the chucking position, like the first guide roller 411. In addition, the second pivot plate 420 has a pin 423 inserted into the elongate hole 413 so that the second pivot plate 420 is linked to the first pivot plate 410. Furthermore, the second pivot plate 420 has a first locking groove 424 formed on the edge of the second pivot plate 420 to be engaged with the locking lug 710 of the locking lever 700 at the original position which the first disc 1 has not been entered (in the state shown in FIG. 6). The second pivot plate 420 is also formed with a second locking groove 425 spaced from the first locking groove 424 by a predetermined distance. In the state in which the second pivot plate 420 has been additionally pivoted in the D direction by the first disc 1 as the first disc 1 is entered, the locking lug 710 is engaged again with the second locking groove 425 as shown in FIG. 10. When the second pivot plate 420 is located at a 'middle position' in this manner, the first disc 1 is laid on the chucking position and the first and second guide rollers 411, 421 are respectively in contact with the first disc 1.

In addition, a guide pin 426 is formed on the top surface of the second pivot plate 420 to project upwardly. The guide pin 426 is guided by the movement of the sub chassis 600 and additionally pivots the second pivot plate 420 in the D direction from the 'middle position.' As such, the first pivot plate 410 linked to the second pivot plate 420 is also additionally pivoted in the C direction, and the first and second guide rollers 411, 421 can be separated from the first disc 1. Furthermore, the second pivot plate 420 has a contact part 427 formed by bending a part of the edge of the second pivot plate 420 downwardly. When the second pivot plate 420 is additionally rotated in the D direction from its original position of FIG. 7 to the 'middle position,' i.e., to the position shown in FIG. 10, the contact part 427 pushes one end of the first pushing lever 430, thereby rotating the first pushing lever 430 in the C direction. Accordingly, the other end of the first pushing lever 430 pushes the slider 300 in the A1 direction while the first pushing lever 430 is being rotated in the C direction, whereby the first rack gear 310 and the driving gear 250 are engaged with each other, as shown in FIG. 8.

Meanwhile, the first and second springs 440, 450 are respectively connected to the main chassis 100 and elastically bias the first and second pivot plates 410, 420 toward their 'original positions,' respectively.

The second linkage mechanism 500 is pushed and moved by the second disc 2 as the second disc is entered and connects the slider 300 to the power transmission unit 200. The second linkage mechanism 500 includes a second pushing lever 510 rotatably mounted on the second pivot plate 420, and a spring 520 for elastically biasing the second pushing lever 510 in the D direction. One end of the second pushing lever 510 is pushed and rotated by the second disc 2 as the second disc 2 is entered into the chucking position while the other end of the second pushing lever 510 pushes the slider 300 in the A1 direction. That is, because the first pushing lever 430 is immovable when the second disc 2 is entered, the second pushing lever 510 pushes the slider 300 while the second pushing lever 510 is being pushed by the second disc 2, whereby the first rack gear 310 and the driving gear 250 are engaged with each other. The spring 520 is connected to the second pivot plate 420 at one end thereof and connected to the second pushing lever 510 at the other end thereof. Thus, the spring 520 elastically biases the second pushing lever 510 so that the second pushing lever 510 comes into contact with the second disc 2, while the spring 520 moves along with the second pivot plate 420.

Figure 12:
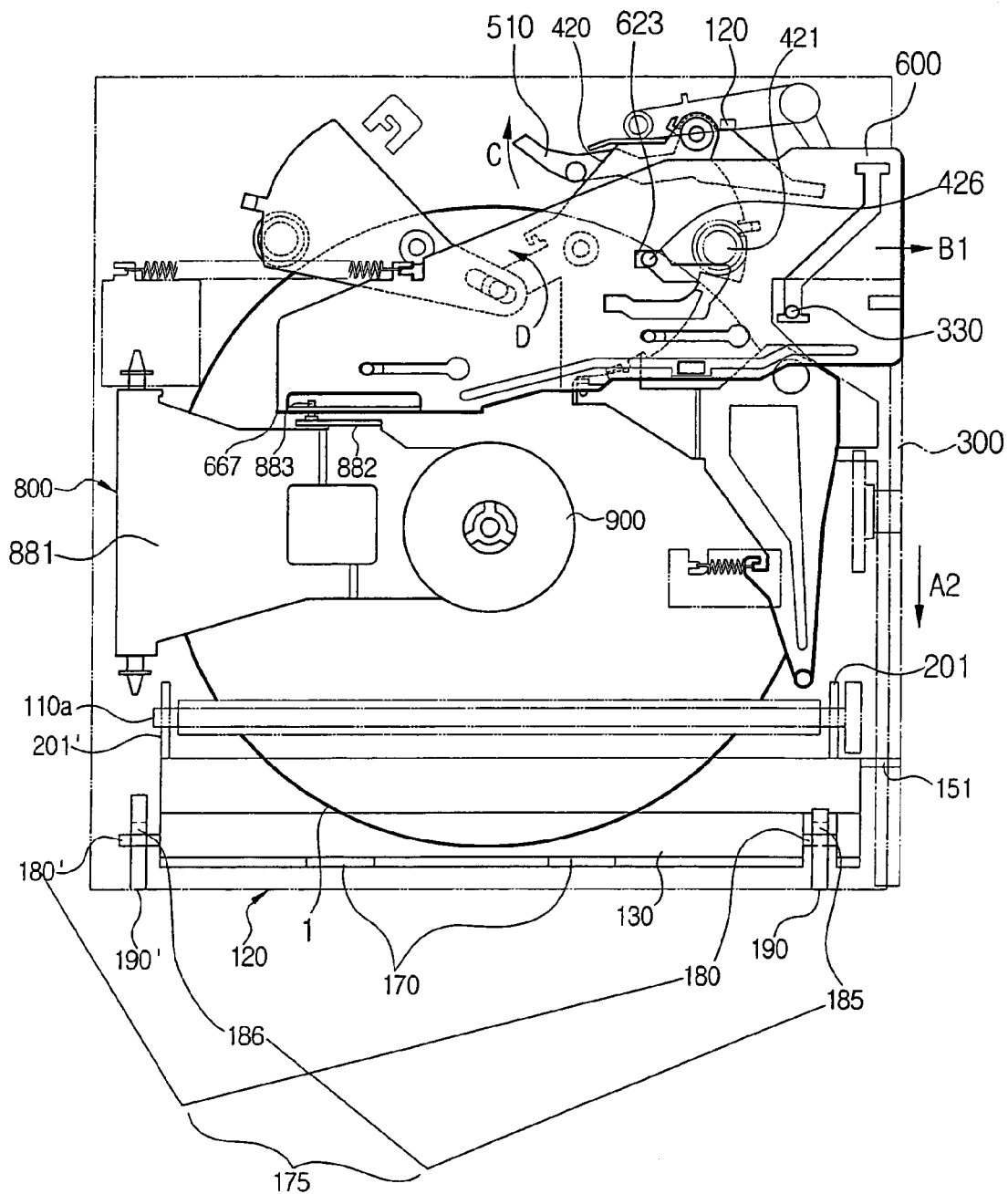

When the first disc 1 is entered, the second pushing lever 510 is moved in the D direction along with the second pivot plate 420 in the state of being in contact with the first disc 1. Then, when the second pivot plate 420 is fully rotated in the D direction and the first guide roller 421 is separated from the first disc 1 as shown in FIG. 12, the first pushing lever 510 comes into contact with the projection part 120 formed on the main chassis 100 and rotates in the C direction, thereby being separated from the first disc 1.

When the second disc 2 is entered, the pushing lever 510 is pushed by the second disc 2 at one end thereof, thereby pushing the slider 300 in the A1 direction. In addition, while the slider 300 is continuously moved in the A1 direction, a projection part 341 laterally extending from the slider 300 pushes the cam part 511 of the second pushing lever 510, whereby the second pushing lever 510 is separated from the second disc 2.

The sub chassis 600 is mounted on the main chassis 100 and is capable of reciprocating in the B1 and B2 directions. The sub chassis 600 reciprocates in linkage with the slider 300 and moves the first linkage mechanism 400, thereby causing the first linkage mechanism 400 to be separated from the first disc 1 or the second disc 2 located at the chucking position. The sub chassis 600 has a sliding cam slit 610 and the cam lug 330 of the slider 300 is engaged into the sliding cam slit 610. When the slider 300 moves in the A1 and A2 directions, the sliding cam slit 610 is drawn and guided by the cam lug 330 and thus the sub chassis 600 moves. The sub chassis 600 also has a separating cam slit 620, into which the guide pin 426 of the second pivot plate 420 is engaged.

The separating cam slit 620 serves to guide the movement of the guide pin 426 so as to separate the first linkage mechanism 400, that is, the first and second guide rollers 411, 421 from either the first disc 1 or the second disc 2 located at the chucking position. The separating cam slit 620 is formed in a two-step shape. That is, the separating cam slit 620 has a arc-shaped main slit 621 for guiding the movement of the guide pin 426 when the first disc 1 is entered and moved to the chucking position, a first slit 623 extending from the top end of the main slit 621, and a second slit 625 extending from the lower end of the main slit 621. The first slit 623 and the second slit 625 are symmetrically formed. The first slit 623 serves to separate the first and second guide rollers 411, 421 from the first disc 1 located at the chucking position. Therefore, when the first disc 1 is entered, if the guide pin 426 is moved upward along the main slit 621 from its original position shown in FIG. 7 and then the sub chassis 600 is moved in the B1 direction, the guide pin 426 is additionally moved upward by the stepped part of the first slit 623, whereby the first and second guide rollers 411, 421 can be separated from the first disc 1. The second slit 625 serves to guide the movement of the guide pin 426 so as to separate the first linkage mechanism from the second disc 2 located at the chucking position. That is, if the second disc 2, which is smaller than the first disc 1, is entered, the first and second guide rollers 411, 421 come into contact with the second disc 2 at their original positions. Therefore, the guide pin 426 also stays at its original position as shown in FIG. 7. If the sub chassis 600 moves in the B1 direction from this state, the guide pin 426 rotates the second pivot plate 420 in the D direction while being guided by the stepped part of the second slit 625, whereby the first pivot plate 410 is rotated in linkage with the second pivot plate 420. Then, the first and second guide rollers 411, 421 are separated from the second disc 2.

By being rotated in linkage with the first disc 1 as being entered or with the sub chassis 600 moved in the B1 direction, the locking lever 700 selectively locks or unlocks the movement of the first linkage mechanism 400. The locking lever 700 is pivotally installed on the main chassis 100. One end of the locking lever 700 is provided with an interference pin 720, which comes into contact with the first disc 1 as the first disc 1 is entered. The other end of the locking lever 700 is provided with a locking lug 710 engaged with each of the first and second locking grooves 424, 425 of the second pivot plate 420. The locking lever 700 is elastically biased in a direction of being locked in the second pivot plate 420 by a spring 740 connected to the main chassis 100. In addition, the locking lever 700 has a guide projection 730 upwardly projected adjacent to the locking lug 710. When the sub chassis 600 moves in the B1 direction, the guide projection 730 is contacted with and pushed by the lower edge 730 of the sub chassis 700, whereby the locking lever 700 is rotated in the D direction, so that the locking lug 710 can be released from the first or second locking groove 424, 425.

The chucking unit 800 is installed on the main chassis 100 to seat the first or second disc 1 or 2 transferred to the chucking position on the turntable (not shown) in the rotatable state.

Figure 2:
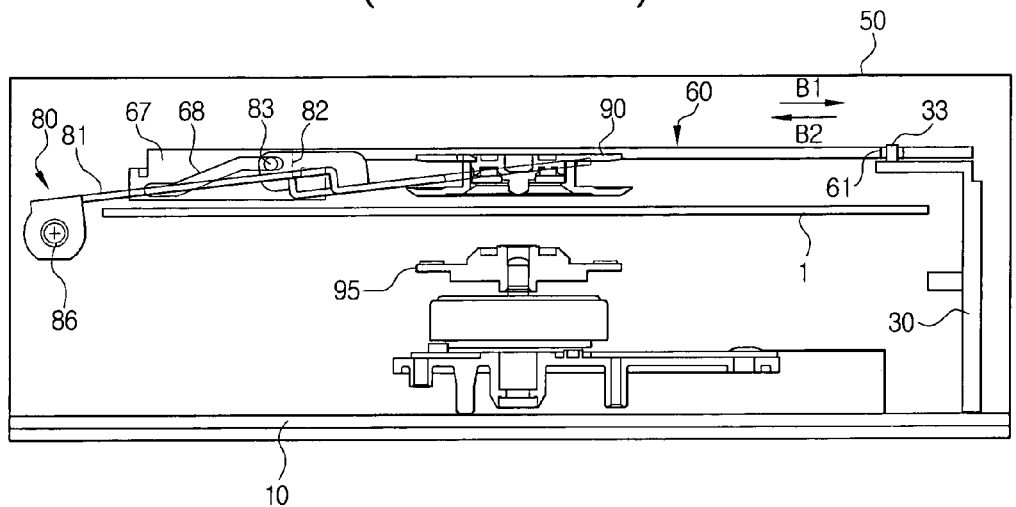
FIG. 2 is a front elevational view of the disc player taken along line I-I in FIG. 1.
Figure 3:
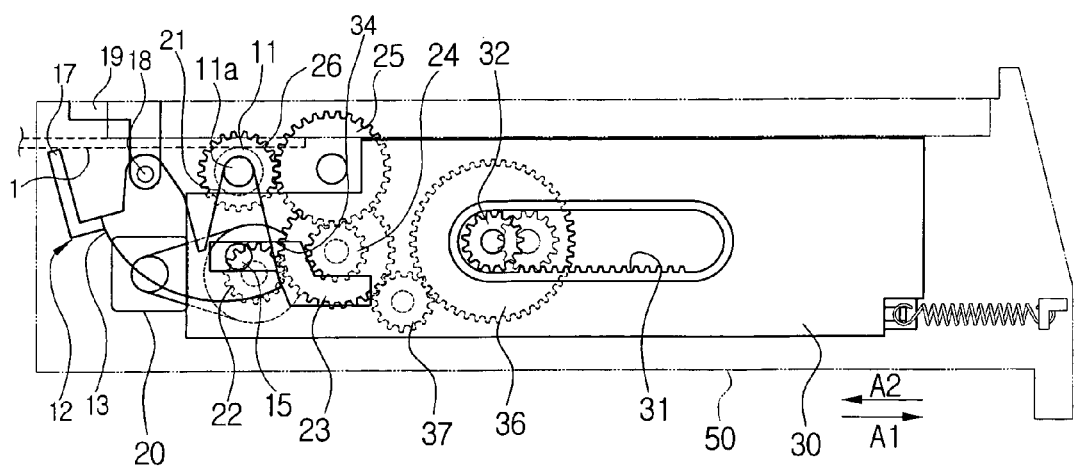
FIG. 3 is a side elevational view of the disc player shown in FIG. 1.
Figure 4:
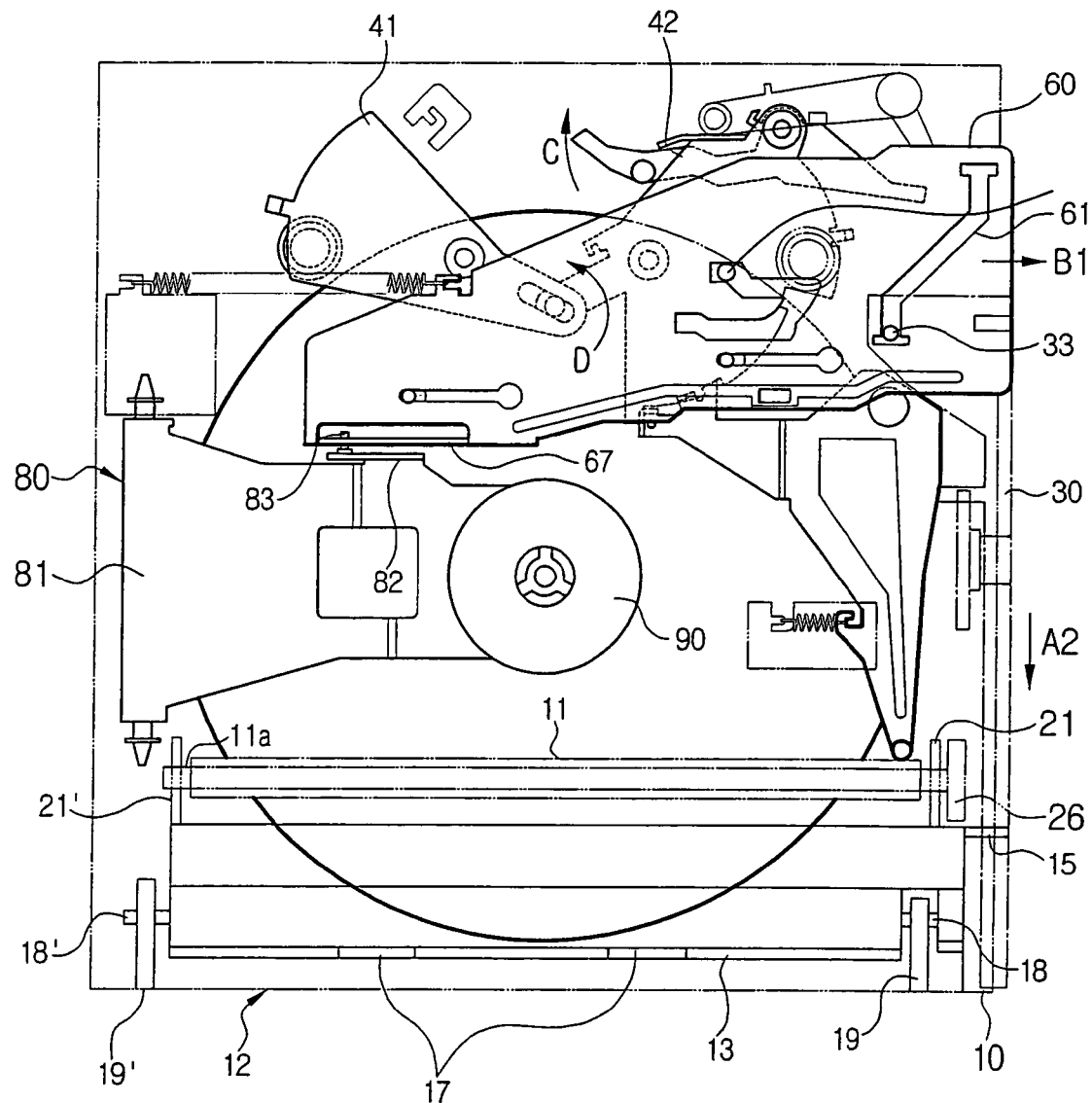
FIGS. 4 through 6 are top plan, front elevational and side elevational views illustrating the disc chucking operation of the disc player shown in FIG. 1, respectively.
Figure 5:
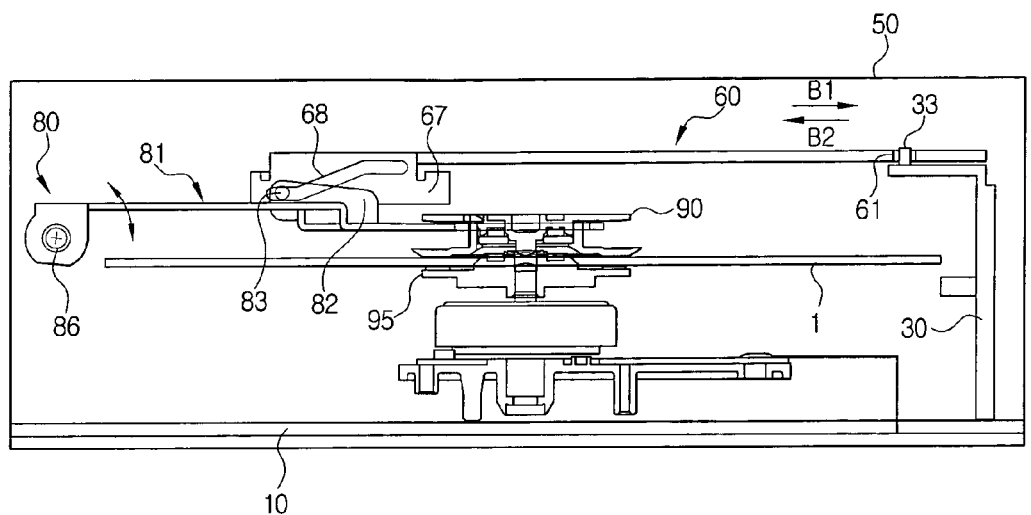

The disc chucking unit 800 includes a chuck bracket 881 mounted on the main chassis 100 that is capable of pivoting up and down by way of the pivot axle 886. At the end of the chuck bracket 881 positioned opposite to the pivot axle 886 is a clamper 900 for clamping the first or second disc 1 or 2 to the turntable. A first vertical surface 882 is formed by bending at the rear end side of the chuck bracket 881. The first vertical surface 882 is provided with a projection pin 883 projected toward the sub chassis 600. The sub chassis 600 is provided with a second vertical surface formed by bending and opposite to the first vertical surface 882. The second vertical surface 667 has a guide slot (not shown) for receiving and guiding the projection pin 883 like the guide slot 68 described above with reference to FIGS. 2 and 5.

The disc roller position-changing apparatus 120 rotates the roller bracket 130, which rotatably supports the disc roller 110, in linkage with the slider 300 moving in the A1 and A2 directions, thereby causing the disc roller 110 to come into contact with or to be separated from the first or second disc 1 or 2.

The disc roller position-changing apparatus 120 includes a movable hinge part 175 for supporting the roller bracket 130 on the first and second support brackets 190, 190', in such a manner that the roller bracket 130 is movable by a predetermined distance and pivotal, a protrusion part 151 formed on the roller bracket 130, and a guide slot part 340 formed in the slider 300 to be opposite to the protrusion part 151 for receiving and guiding the protrusion part 151 and guiding the movement of the protrusion part 151 to pivot the roller bracket 130, thereby lifting or lowering the disc roller 110 supported by the roller bracket.

The movable hinge part 175 includes first and second hinge axles 180, 180' formed at the opposite ends of the front edge of the roller bracket 130, and first and second hinge holes 185, 186 formed to be elongated in the bottom side of the first and second support brackets 190, 190' at the main chassis 100 and to be opposite to the first and second hinge axles 180, 180' to receive and guide the first and second hinge axles 180, 180'. The first and second hinge holes 185, 186 may be vertically formed so as to reduce the angle of rotation of the roller bracket 130 and the operating space carried thereby, they may be formed in an inclined shape of a predetermined angle, e.g., about 45°, so that the fist and second hinge axles 180, 180' are easily movable when the protrusion part 151 is drawn in the A1 direction by the guide slot part 340.

Here, although it has been exemplified and described above that the first and second hinge axles 180, 180' and the first and second hinge holes 185, 186 are formed at the opposite ends of the front edge of the roller bracket 130 and the first and second brackets 190, 190', respectively, to the contrary, the former may be formed at the first and second brackets 190, 190' and the latter may be formed at the opposite ends of the front edge of the roller bracket 130.

A disc takeout prevention plate 170 is formed at the front edge of the roller bracket 130 between the first and second hinge axles 180, 180'. The disc takeout prevention plate 170 serves to block the disc transferring passage behind the first or second disc 1 or 2 after the first or second disc 1 or 2 has been loaded, thereby preventing the first or second disc 1 or 2 from being forcibly taken out.

The protrusion part 151 includes one projection pin formed adjacent to the first support boss 201 to project toward the slider 300, and the guide slot part 340 includes one guide slot formed in the slider to receive the protrusion part 151.

The guide slot part 340 guides the protrusion part 151 that is lifted or lowered as the slider 300 moves. In the present embodiment the guide slot part 340 includes an ascent slot 340*a*, a descent slot 340*c* and a slant slot 340*b* interconnecting the ascent slot 340*a* and the descent slot 340*c*.

Figure 13:
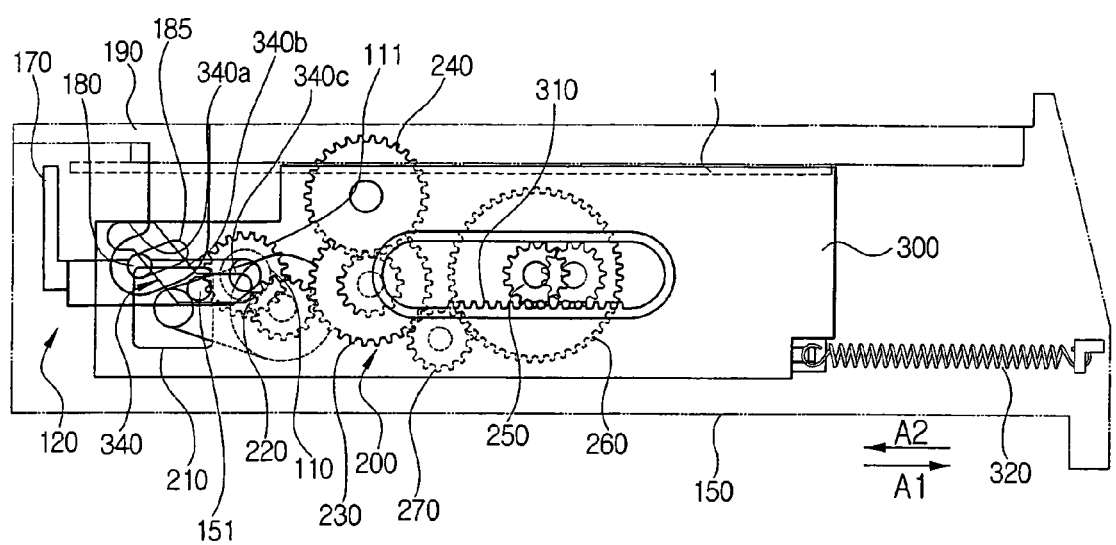

When the first slider 300 is moved in the A2 direction by the first rack gear 310 and the driving gear 250 from the position shown in FIGS. 7 and 8 after the first or second disc 1 or 2 has been loaded on the chucking position, the first and second hinge axles 180, 180' are lowered to the lower side of the first and second hinge holes 185, 186 by the weight of the roller bracket 130 as the protrusion part 151 drawn by the left end of the ascent slot 340*a* of the guide slot part 340, is released. After the first and second hinge axles 180, 180' have been fully lowered to the lower side of the first and send hinge holes 185, 186, the protrusion part 151 formed at the roller bracket 130 is guided and lowered toward the descent slot 340*c* by being guided by the guide slot part 340 provided in the slider 300. As a result, the roller bracket 130 pivots clockwise about the first and second hinge axles 180, 180' which have been lowered to the lower side of the first and second hinge holes 185, 186, and the disc roller 110 supported by the roller bracket 130 is lowered and separated from the first or second disc 1 or 2, as shown in FIGS. 12 and 13. At this time, the disc takeout prevention plates 170 formed at the front edge of the roller bracket 130 are vertically positioned to block the disc transferring passage behind the first or second disc 1 or 2, so that the first or second disc 1 or 2 cannot be forcibly taken out.

To the contrary, when the slider 300 is moved in the A1 direction from the position shown in FIGS. 12 and 13 by the rack gear 310 and the driving gear 250, the protrusion part 151 formed on the roller bracket 130 is guided by the guide slot part 340 provided in the slider 300 and lifted toward the ascent slot 340*a*. As a result, the roller bracket 130 is pivoted counterclockwise about the first and second hinge axles 180, 180' lowered toward the lower side of the first and second hinge holes 185, 186, and the disc roller 110 supported by the roller bracket 130 is lifted and approaches to the first or second disc 1 or 2. Then, if the first protrusion part 151 is drawn in the A1 direction by the left end of the ascent slot 340*a* after the protrusion part 151 has been fully lifted toward the ascent slot 340*a*, the first and second hinge axles 180, 180' are lifted toward the upper side of the first and second hinge holes 185, 186. As a result, the disc roller 110 supported by the roller bracket 130 is fully lifted and comes into contact with the first or second disc 1 or 2, as shown in FIG. 8. At this time, the disc takeout prevention plate 170 formed at the front edge of the roller bracket 130 is positioned at the open position to open the disc transferring passage by being lowered behind the first or second disc 1 or 2 so that the first or second disc 1 or 2 can be discharged.

Now, the disc loading operation of the disc player having a disc roller position-changing apparatus according to an embodiment of the present invention is described in detail.

At first, the operations of loading a 120 mm size disc, i.e., the first disc 1 is described.

As shown in FIG. 7, the first disc 1 is entered into the housing 150 in the loading direction, i.e., in the A1 direction. As such, the controller (not shown) drives the driving motor 210 (see FIG. 8) according to a signal from a disc detection sensor (not shown) for detecting the entry of the first disc 1. Then, the first disc 1 is drawn into the housing 150 by the rotation of the disc roller 110.

Figure 9:
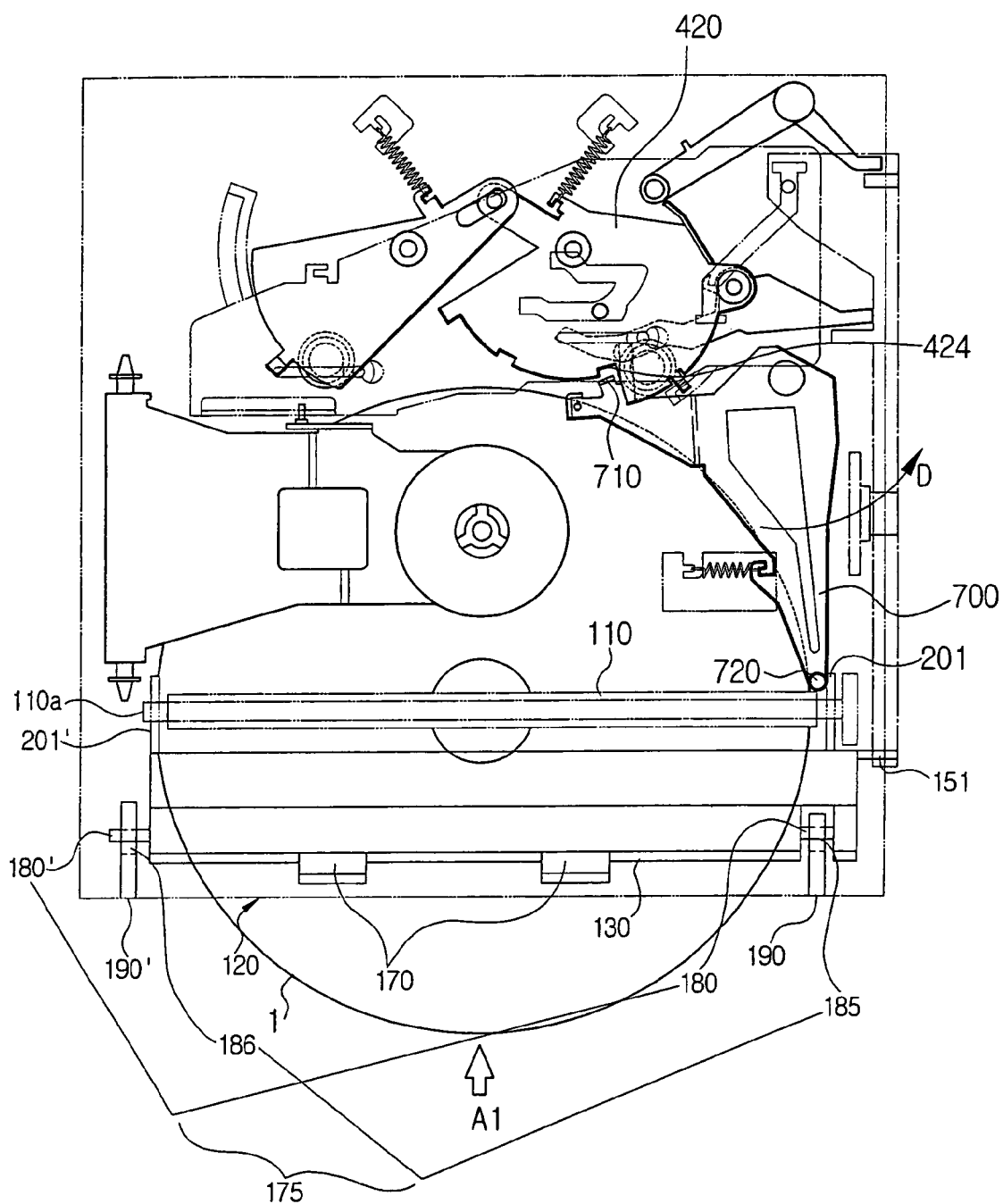
FIGS. 9 through 13 are schematic views illustrating the operations for loading a 120 mm size disc into the disc player shown in FIG. 7, respectively.

Referring to FIG. 9, when the first disc 1 is entered, the first disc 1 comes into contact with the locking pin 720 of the locking lever 700 and rotates the locking lever 700 in the D direction. Then, the locking lug 710 of the locking lever 700 is separated from the first locking groove 424 of the second pivot plate 420. If the first disc 1 is additionally entered from this state, the first disc 1 moves to the chucking position while pushing the first and second guide rollers 411, 421, as shown in FIG. 10. Thus, the first and second pivot plates 410, 420 are rotated in the opposite directions from one another and the guide pin 426 is upwardly moved along the main slit 621. In addition, the contact part 427 of the second pivot plate 420 pushes one end 431 of the first pushing lever 430. Then, the other end 433 of the first pushing lever 430 pushes the slider 300 for a predetermined distance in the A2 direction while the first pushing lever 430 is rotated in the C direction.

Further, the locking lever 700 is returned to its original position, and the locking lug 710 is locked to the second locking groove 425 of the second pivot plate 420. Thus, the first and second guide rollers 411, 421 are fixed in position in the state of being in contact with the first disc 1.

Figure 11:
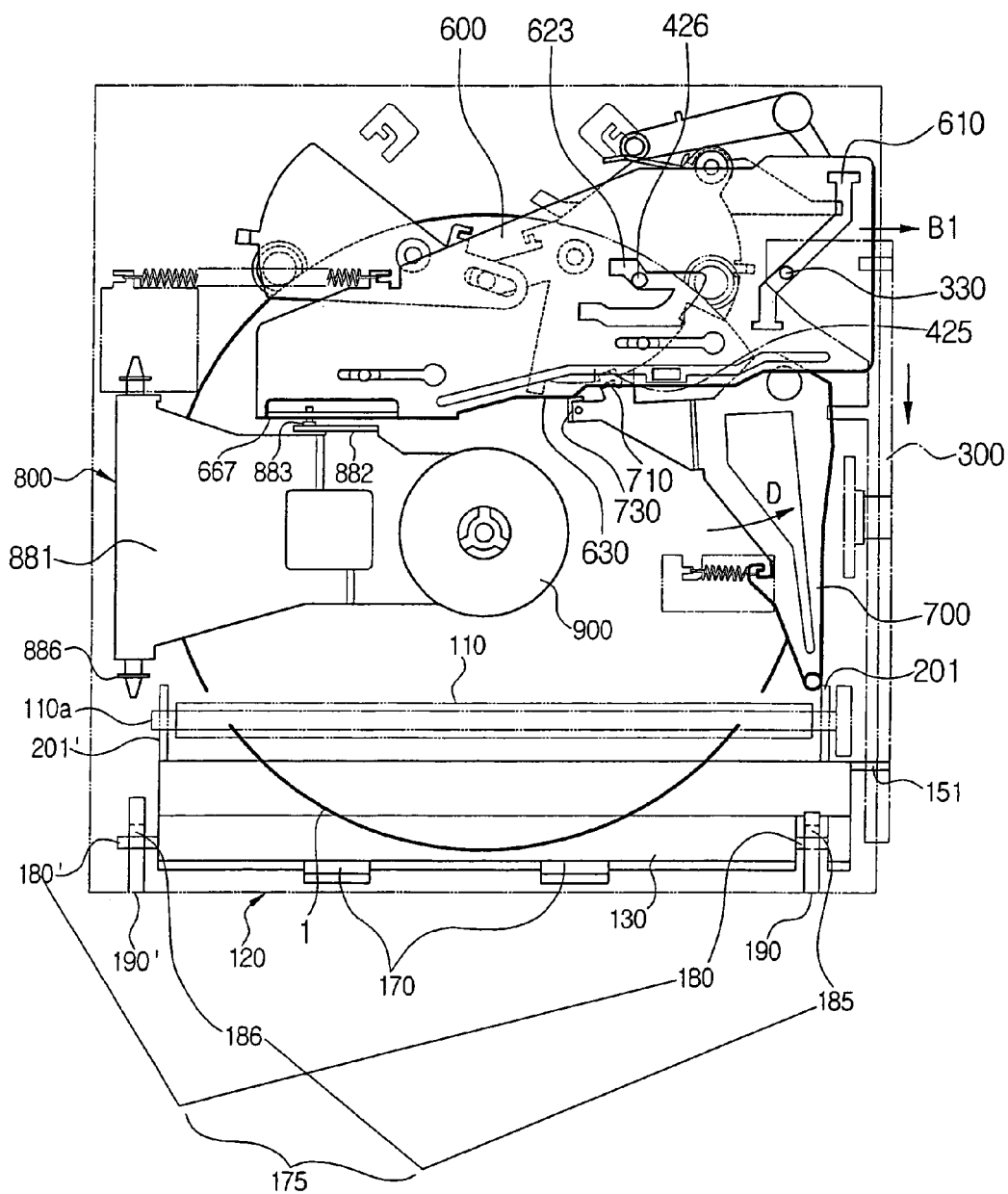

Next, when the slider 300 is pushed to a predetermined distance in the A2 direction, the first rack gear 310 is meshed with the driving gear 250 as shown in FIG. 8. Then, the power of the driving gear 250 is transmitted to the first rack gear 310, and thus the slider 300 is continuously moved in the A2 direction. Then, as shown in FIG. 11, the cam slit 610 of the sub chassis 600 is guided by the movement of the cam lug 330 and the sub chassis 600 is moved in the B1 direction. When the sub chassis 600 is moved in the B1 direction, the guide pin 426 is entered into the first slit 623. Then, the edge 430 of the sub chassis 600 pushes the guide lug 730 of the locking lever 700, thereby rotating the locking lever 700 in the D direction. Thus, the locking lug 710 is separated from the second locking groove 425 and unlocked. From this state, when the slider 300 is additionally moved in the A2 direction, the sub chassis 600 is pulled by the cam lug 330 and fully moved in the B1 direction, as shown in FIG. 12. Then, the guide pin 426 additionally rotates the second pivot plate 420 in the D direction while being guided in the first slit 623, whereby the first and second guide rollers 411, 421 are separated from the first disc 1.

In addition, when the second pivot plate 420 is additionally pivoted over a predetermined range of arc by the first slit 623, one end of the pushing lever 510 is contacted with and supported by the projection part 120 projected downwardly at a predetermined position of the main chassis 100. Accordingly, the second pushing lever 510 is rotated over a predetermined range of arc in the C direction and separated from the first disc 1.

Furthermore, when the sub chassis 600 moves in the B1 direction, the guide slot of the second vertical surface 667 of the sub chassis 600 also moves in the B1 direction. As a result, the projection pin 883 provided on the first vertical surface 882 of the chuck bracket 881 of the disc chucking unit 800 is lowered while being guided by the guide slot. As the projection pin 883 is lowered, the chuck bracket 881 is downwardly pivoted about the pivot axle 886, with the result that the clamper 900 installed at the tip end of the chuck bracket 881 clamps the first disc 1 on the turntable to be capable of rotating.

Moreover, as the slider 300 moves in the A2 direction, the first and second hinge axles 180, 180' are lowered toward the lower side of the first and second hinge holes 185, 186 by the weight of the roller bracket 130 as the protrusion part 151 drawn by the left end of the ascent slot 340a of the guide slot part 340 is released. After the first and second hinge axles 180, 180' have been fully lowered toward the lower side of the first and second hinge holes 185, 186, the protrusion part formed on the roller bracket 130 is guided by the guide slot part 340 provided in the slider 300 and lowered toward the descent slot 340c. As a result, the roller bracket 130 is pivoted clockwise about the first and second hinge axles 180. 180', which have been lowered toward the lower side of the first and second hinge holes 185, 186, and the disc roller 110 supported by the roller bracket 130 is lowered and separated from the first disc 1, as shown in FIG. 13. At this time, the disc takeout prevention plate 170 formed at the front edge of the roller bracket 130 is vertically positioned to block the disc transferring passage behind the first disc 1 so that the first disc 1 cannot be forcibly taken out.

As a result, the loading operation of the first disc 1 is completed.

From this state, the first disc 1 is rotated on the turntable and an optical pickup (not shown) records information into or reproduces recorded information from the disc 1.

Now, the unloading operation of the first disc 1 after information is recorded into or reproduced from the first disc 1 is described.

At first, the driving motor 210 is reversely rotated to return the slider 300 in the A1 direction. Then, the sub chassis 600 is also returned in the B2 direction (see FIG. 7). As a result, the disc chucking unit 800 and the disc roller position-changing apparatus 120 operate in the reversed sequence as to the operation of loading the first disc 1. As such, the first disc 1 is separated from the turntable and at the same time comes into contact with disc roller 110 to be discharged out of the housing 150 by the disc roller 110.

Next, the loading operation of a second disc 2, i.e., an 80 mm size disc, which is smaller than the first disc 1, is described.

Figure 14:
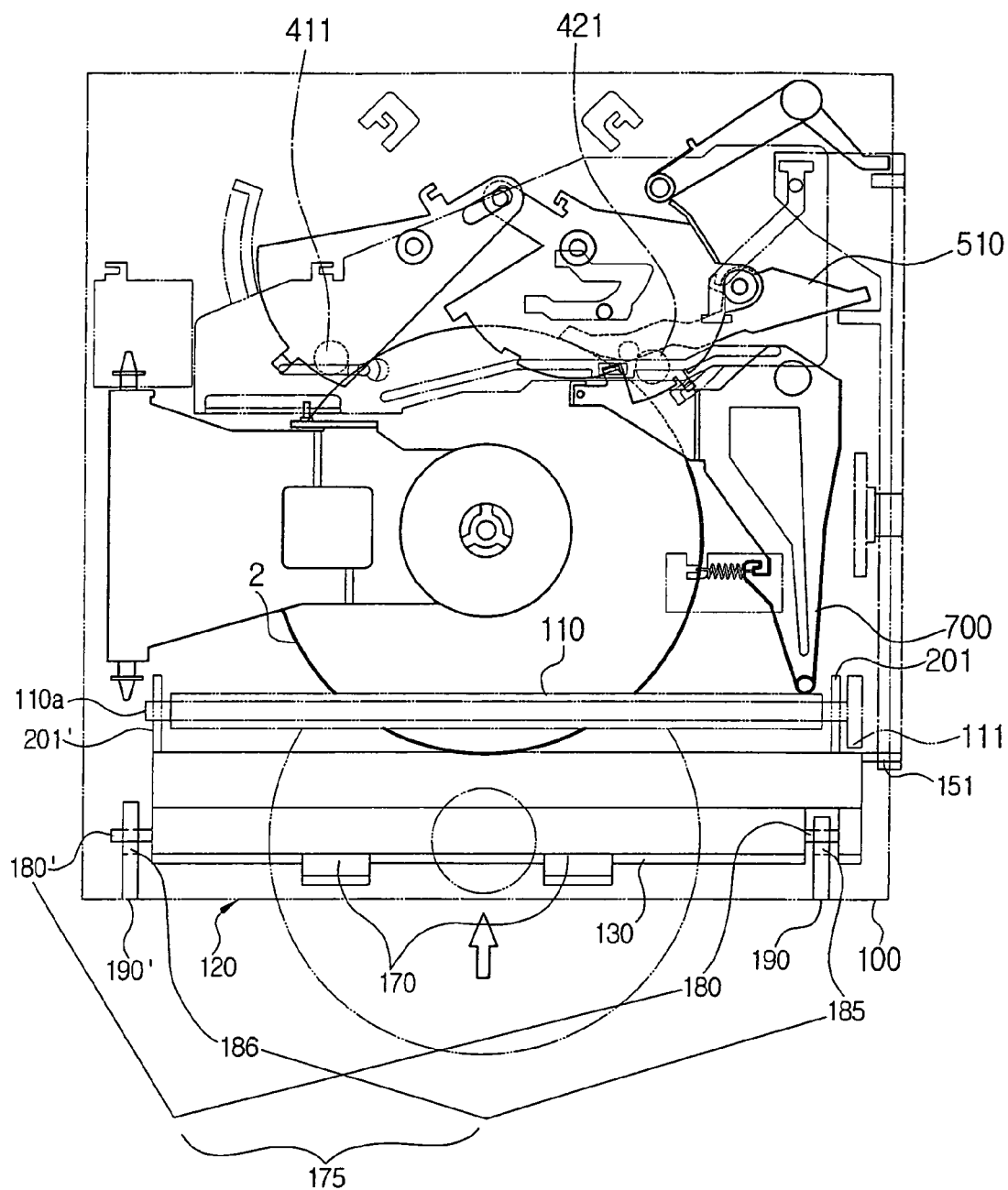
FIGS. 14 through 17 are schematic views illustrating the operations for loading an 80 mm size disc into the disc player shown in FIG. 7.
Figure 15:
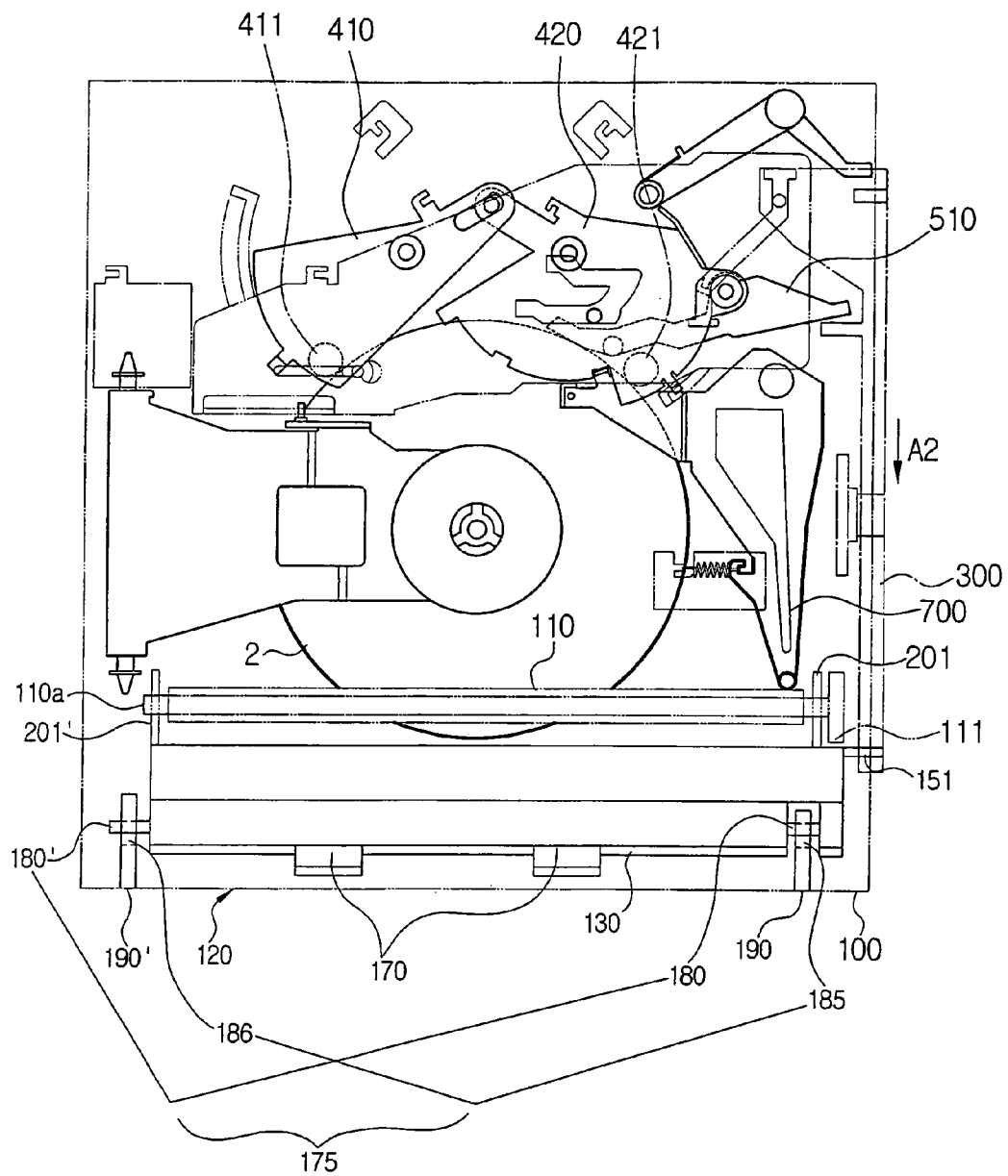
Figure 16:
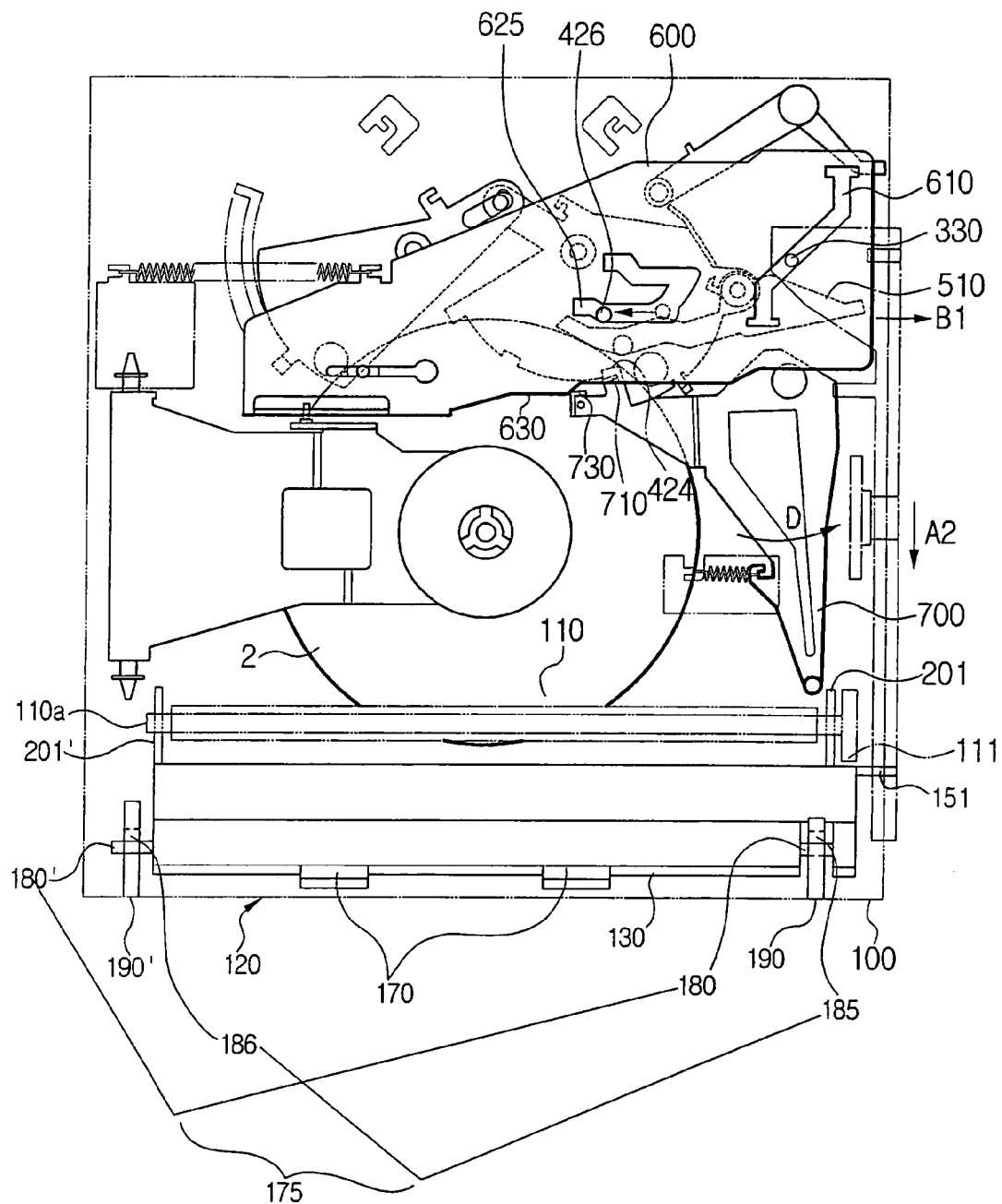

As depicted by phantom lines in FIG. 14, the second disc 2 is entered into the underside of the main chassis 100 and engaged with the disc roller 110. Then, while being rotated, the disc roller 110 transfers the second disc 2 to the position depicted by solid lines in FIG. 14. In that event, because the second disc 2 has a small diameter unlike the first disc 1, the second disc 2 does not interfere with the locking lever 700. And, the second disc 2 comes into contact with one end of the second pushing lever 510 before it comes into contact with the first and second guide rollers 411, 421. When the second disc 2 is further entered from this state, the second pushing lever 510 is pushed by the second disc 2 and rotated as shown in FIG. 15. In addition, the second pushing lever 510 pushes the slider 300 in the A2 direction while being rotated. Then, like the case of entering the first disc 1, the rack gear 310 is engaged with the driving gear 250, whereby the slider 300 is continuously moved in the A2 direction, as shown in FIG. 8. When the slider 300 is continuously moved in the A2 direction, the sub chassis 600 is guided by the cam lug 330 and moved in the B1 direction as shown in FIG. 16. And, the guide pin 426 is entered into the second slit 625. In addition, while the sub chassis 600 is moved in the B1 direction, the lower edge 630 pushes the guide lug 730 of the locking lever 700, thereby rotating the locking lever 700 in the D direction. Thus, the locking lug 710 is released from the first locking groove 424.

Figure 17:
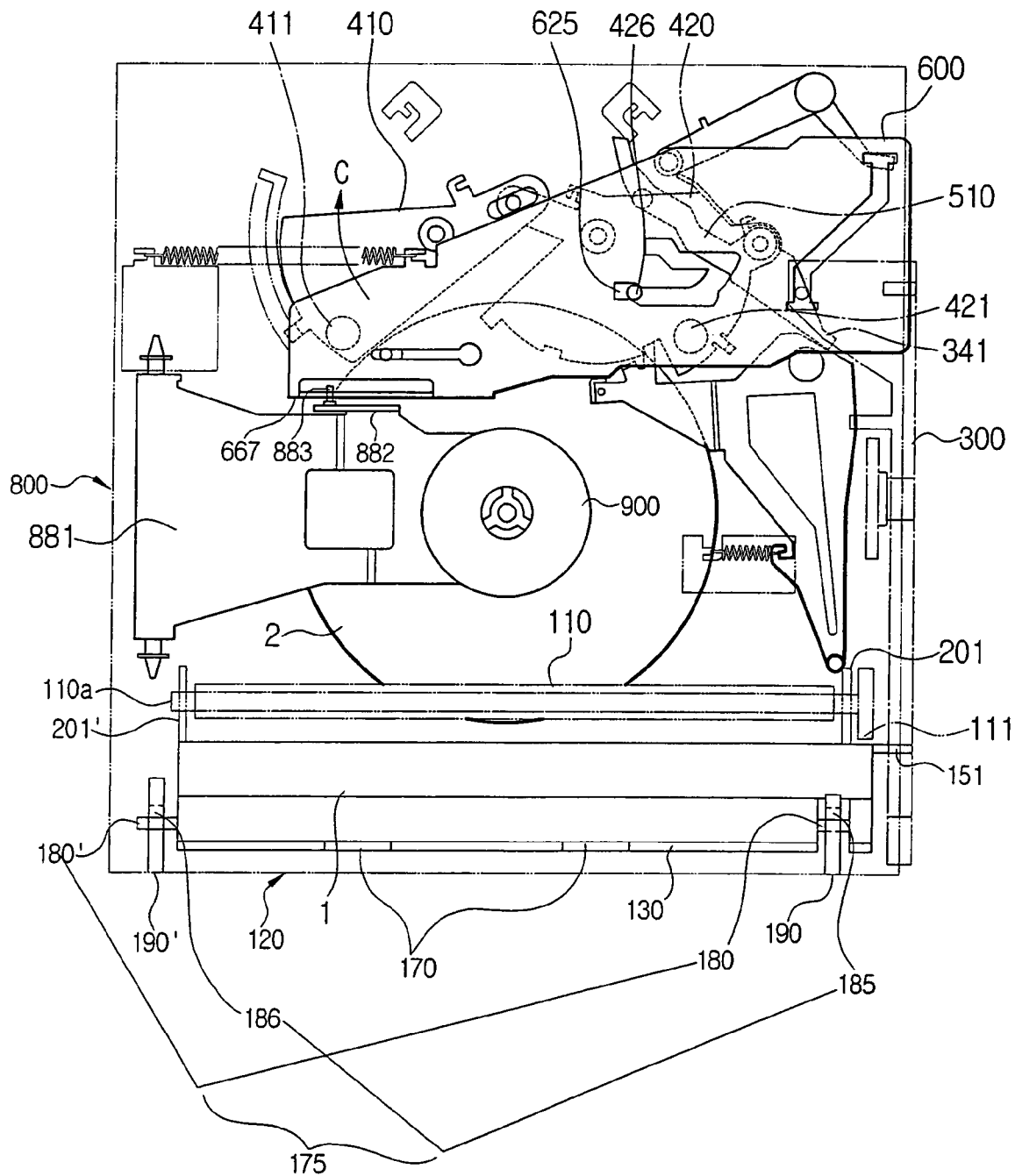

Next, when the slider 300 has been fully moved in the A2 direction, the guide pin 426 is entered into the second slit 625 and the second pivot plate 420 is rotated for a predetermined range of arc in the D direction, as shown in FIG. 17. The first pivot plate 410 is rotated in the C direction in the linkage with the second pivot plate 420. Thus, the first and second guide rollers 411, 421 are separated from the second disc 2.

When the slider 300 is fully moved in the A2 direction, the projection part 341 formed at the top end of the slider 300 comes into contact with the cam part 511 of the second pushing lever 510 and rotates the second pushing lever 510. Accordingly, the second pushing lever 510 is rotated in the C direction and separated from the second disc 2 moved to the chucking position.

Upon being positioned in this state, the second disc 2 is seated on the turntable (not shown) in the state of being chucked by the chucking unit 800 and positioned in the state of being rotatable.

When the second disc 2 is fully seated on the turntable, the disc roller 110 is separated from the second disc 2 by the disc position-changing apparatus 120 like the case of loading the first disc 1. The turntable is rotated in the state in which the second disc 2 has been fully seated on the turntable as mentioned above, and an optical pickup is driven to record information into or reproduce recorded information from the second disc.

The unloading operations of the second disc 2 are performed in the reversed sequence as to the loading operations thereof, like the unloading operations of the first disc 1.

As described above, because the disc roller position-changing apparatus supports the disc roller bracket in such a manner that the roller bracket is movable for a predetermined distance on the support brackets of the main chassis when the disc roller is contacted with or separated from a disc, it is possible to reduce the operating space of the roller bracket and the height of a guide slot part, whereby it is possible to slim a resultant disc player having such a disc roller position-changing apparatus.

While the preferred embodiments of the present invention have been shown and described in order to exemplify the principle of the present invention, the present invention is not limited to the specific embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. A disc roller position-changing apparatus of a disc player including a disc roller for transferring a disc and a roller bracket for rotatably supporting the disc roller, the disc roller position-changing apparatus comprising:
   a movable hinge part for supporting the roller bracket on a main chassis such that the roller bracket is movable by a predetermined distance and pivotal, the movable hinge part including:
      at least one hinge axle formed on one of the roller bracket and main chassis; and
      at least one hinge hole having an elongated shape and being inclined at a predetermined angle, the at least one hinge hole formed in the other of the roller bracket and the main chassis to receive and guide the hinge axle;
   a protrusion part formed on the roller bracket; and
   a slider installed to be capable of reciprocating in a disc loading direction, the slider including a guide slot part for receiving and guiding the protrusion part, the at least one hinge axle being lowered to a lower side of the at least one hinge hole by the weight of the roller bracket as the protrusion part is released.

2. The disc roller position-changing apparatus of claim 1, wherein the protrusion part comprises at least one projection pin, and the guide slot part comprises at least one guide slot.

3. The disc roller position-changing apparatus of claim 2, wherein the guide slot comprises an ascent slot, a descent slot, and a slant slot interconnecting the ascent slot and descent slot.

4. A disc player for recording information into or reproducing recorded information from either a first disc of a first size or a second disc of a second size, the disc player comprising:
   a main chassis provided with a roller bracket rotatably supporting a disc roller for transferring one of the first and second discs into the disc player;
   a slider mounted on the main chassis to be capable of reciprocating in a disc loading direction and selectively connected to a power transmission unit for transmitting power from a driving motor depending on moving position thereof, thereby being reciprocated; and
   a disc roller position-changing apparatus for bringing the disc roller into contact with, or separating the disc roller from the first or second disc, the first or second disc being in linkage with the slider, the disc roller position-changing apparatus including,
   a movable hinge part for supporting the roller bracket on the main chassis such that the roller bracket is movable by a predetermined distance and pivotal, the movable hinge part including at least one hinge axle formed on one of the roller bracket and main chassis and at least one hinge hole having an elongated shape and being inclined at a predetermined angle, the at least one hinge hole formed in the other of the roller bracket and the main chassis to receive and guide the hinge axle;
   a protrusion part formed on the roller bracket; and
   a guide slot part formed in the slider to receive and guide the protrusion part so that the roller bracket is pivoted about the movable hinge part, the at least one hinge axle being lowered to a lower side of the at least one hinge hole by the weight of the roller bracket as the protrusion part is released.

5. The disc player of claim 4, wherein the protrusion part includes at least one projection pin, and the guide slot part comprises at least one guide slot.

6. A disc player of claim 5, wherein the guide slot comprises an ascent slot, a descent slot, and a slant slot interconnecting the ascent slot and descent slot.

7. A disc player comprising:
   a main chassis having a disc roller for transferring a first disc or a second disc rotatably mounted thereon;
   a power transmission unit for transmitting power of a driving motor to the disc roller;
   a slider selectively connected to the power transmission unit;
   a first linkage mechanism operated at the time of loading the first disc;
   a second linkage mechanism operated at the time of loading the second disc;
   a sub chassis reciprocating in linkage with the slider;
   a locking lever for selectively locking or unlocking the movement of the first linkage mechanism; and
   a disc roller position-changing apparatus for bringing the disc roller into contact with, or separating the disc roller from, where the first or second disc is in linkage with the slider the disc roller position-changing apparatus including:
      a movable hinge part for supporting the disc roller on the main chassis such that the disc roller is movable by a predetermined distance and pivotal, the movable hinge part including at least one hinge axle formed on one of the disc roller and main chassis and at least one hinge hole having an elongated shape and being inclined at a predetermined angle, the at least one hinge hole formed in the other of the disc roller and the main chassis to receive and guide the hinge axle;
      a protrusion part formed on the disc roller; and
      a slider installed to be capable of reciprocating in a disc loading direction, the slider including a guide slot part for receiving and guiding the protrusion part, the at least one hinge axle being lowered to a lower side of the at least one hinge hole by the weight of the disc roller as the protrusion part is released.

8. The disc player of claim 7, wherein the power transmission unit comprises:
   a plurality of connection gears for transmitting the power of the driving motor to a driven gear connected to the disc roller;
   a driving gear selectively meshed with a first rack gear provided in the slider;
   a main gear coaxially connected to the driving gear; and
   a simple connection gear interposed between the main gear and the connection gears,
   wherein the driving motor is bi-directionally rotatable.

9. The disc player of claim 7, wherein the first linkage mechanism comprises:
   a first pivot plate mounted on the main chassis capable of rotating over a predetermined range of arc;
   a second pivot plate mounted on the main chassis linked with the first pivot plate and capable of rotating over a predetermined range of arc;
   a first pushing lever linked with the second pivot plate to push the slider by a predetermined distance in a disc loading direction;
   a first spring for elastically biasing the first pivot plate to come into contact with the first disc when loaded in the disc player; and a second spring for elastically biasing the second pivot plate to come into contact with the first disc when loaded in the disc player.

10. The disc player of claim 9, wherein the first pivot plate comprises:
a first guide roller which comes into contact with the first disc as the first disc is entered, thereby guiding the first disc to a chucking position; and
an elongate hole formed at one end of the first pivot plate.

11. The disc player of claim 10, wherein the second pivot plate comprises:
a second guide roller which comes into contact with the first disc as the first disc is entered, thereby guiding the first disc to a chucking position;
a pin inserted into the elongate hole so that the second pivot plate is linked to the first pivot plate;
a first locking groove formed on the edge of the second pivot plate to be engaged with the locking lever; and
a second locking groove spaced apart from the first locking groove.

12. The disc player of claim 11, wherein the second pivot plate comprises:
a guide pin formed on the top surface of the second pivot plate; and
a contact part formed by bending a part of an edge of the second pivot plate downwardly,
wherein the guide pin is guided by the movement of the sub chassis and additionally pivots the second pivot plate.

13. The disc player of claim 7, wherein the at least one movable hinge part comprises first and second hinge axles, each formed at a respective opposite end of a front edge of the roller bracket.

14. The disc player of claim 13, wherein the disc roller position-changing apparatus further comprises:
a disc takeout prevention plate formed at a front edge of the roller bracket between the first and second hinge axles.

15. The disc player according to claim 7, wherein the protrusion part comprises a projection pin formed to project towards the slider.

* * * * *

UNITED STATES PATENT AND TRADEMARK OFFICE
CERTIFICATE OF CORRECTION

PATENT NO. : 7,437,745 B2　　　　　　　　　　　　　　　　　　　　　　　　Page 1 of 1
APPLICATION NO. : 11/176399
DATED : October 14, 2008
INVENTOR(S) : Young-yun Seol It is certified that error appears in the above-identified patent and that said Letters Patent is hereby corrected as shown below:

Column 14, Line 24, Claim 6 change "slider" to --slider,--.

Signed and Sealed this

Thirtieth Day of December, 2008

JON W. DUDAS
*Director of the United States Patent and Trademark Office*